July 20, 1965
D. GAUBAN ETAL
3,195,186
APPARATUS FOR CLAMPING MOLD PARTS
Filed June 13, 1962
4 Sheets-Sheet 3
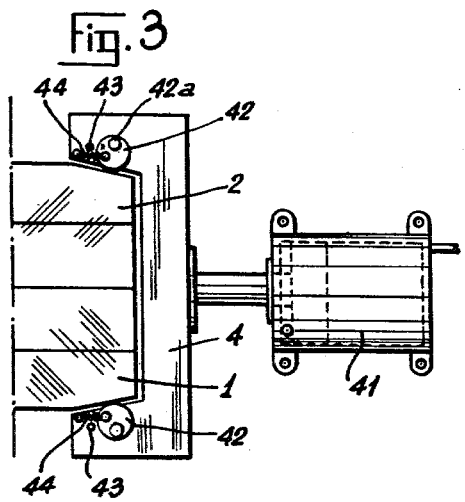
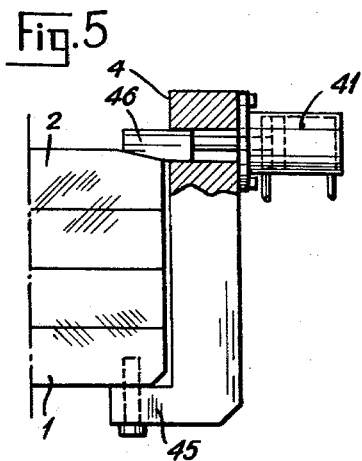
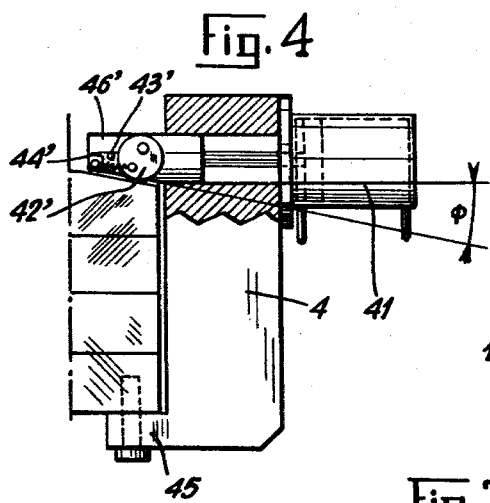
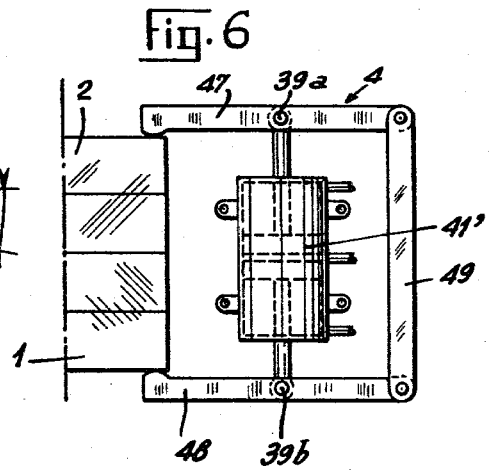
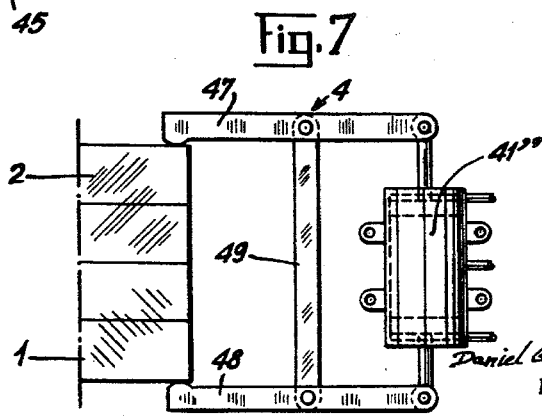
INVENTOR
Daniel Gauban and Jean Raclot
BY
Theodore Bishoff
ATTORNEY

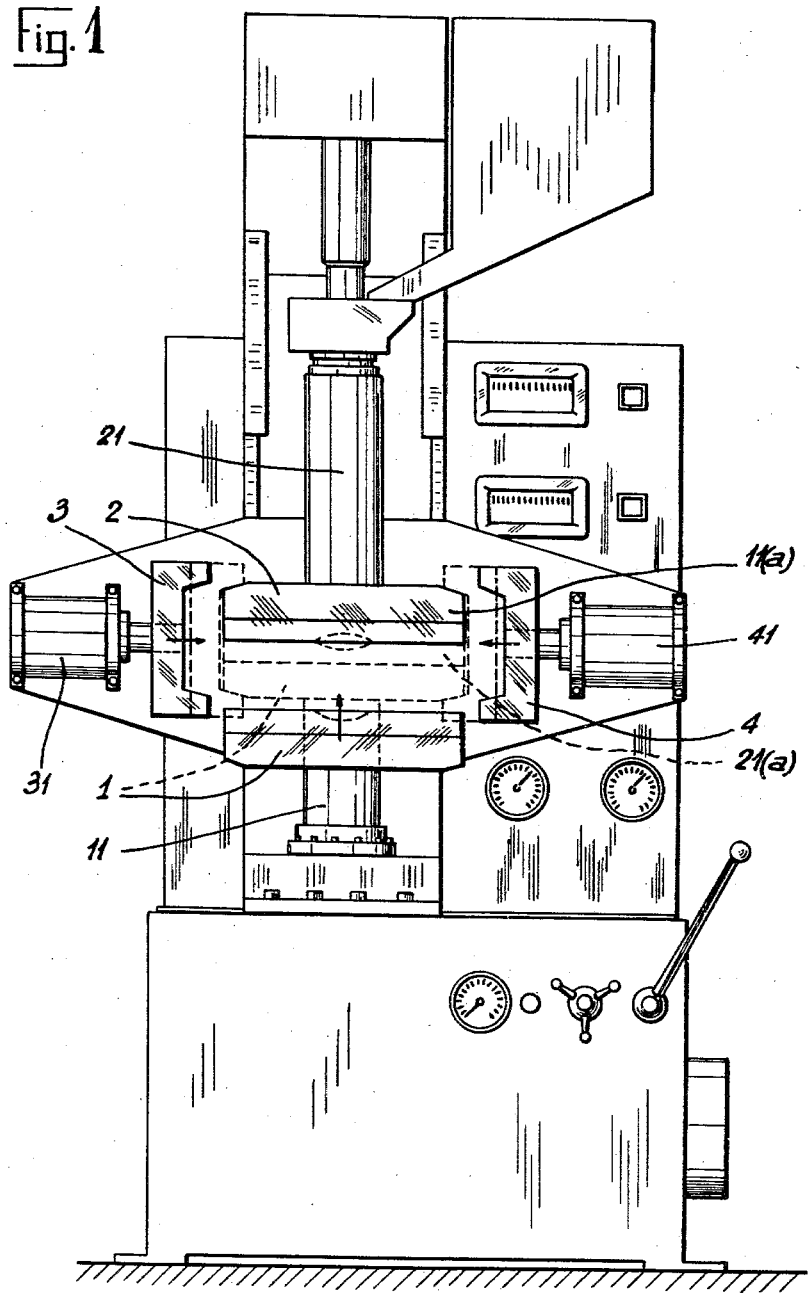

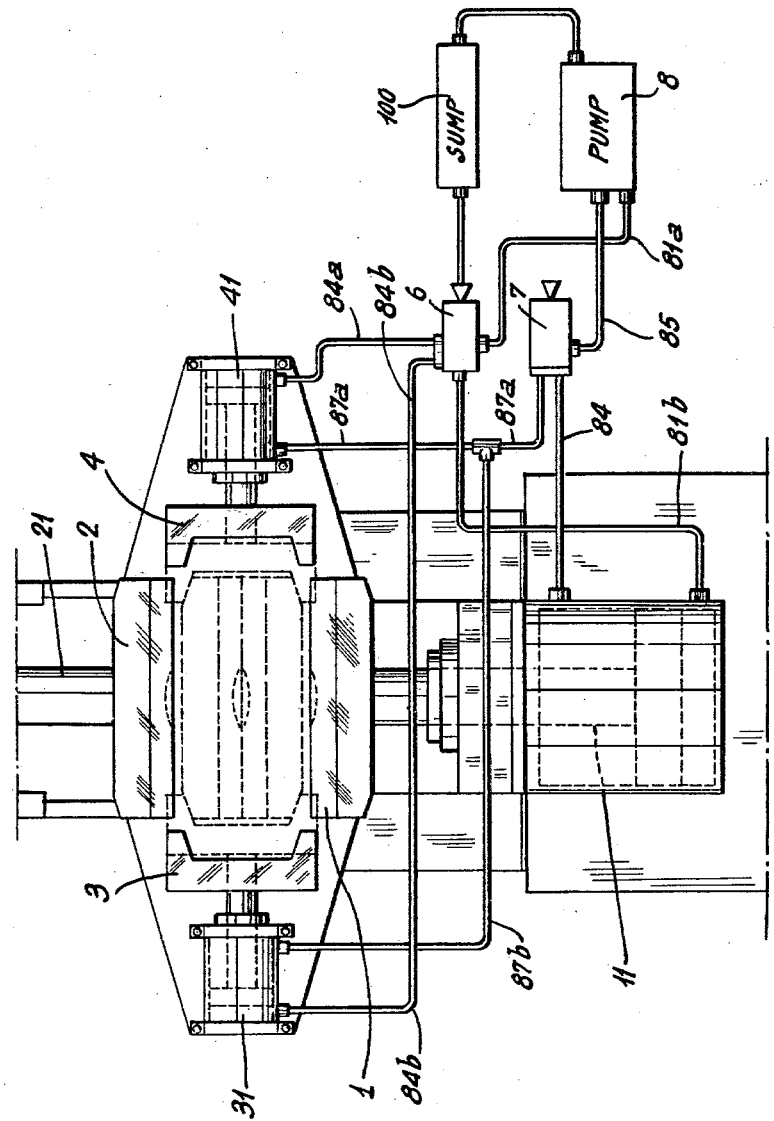

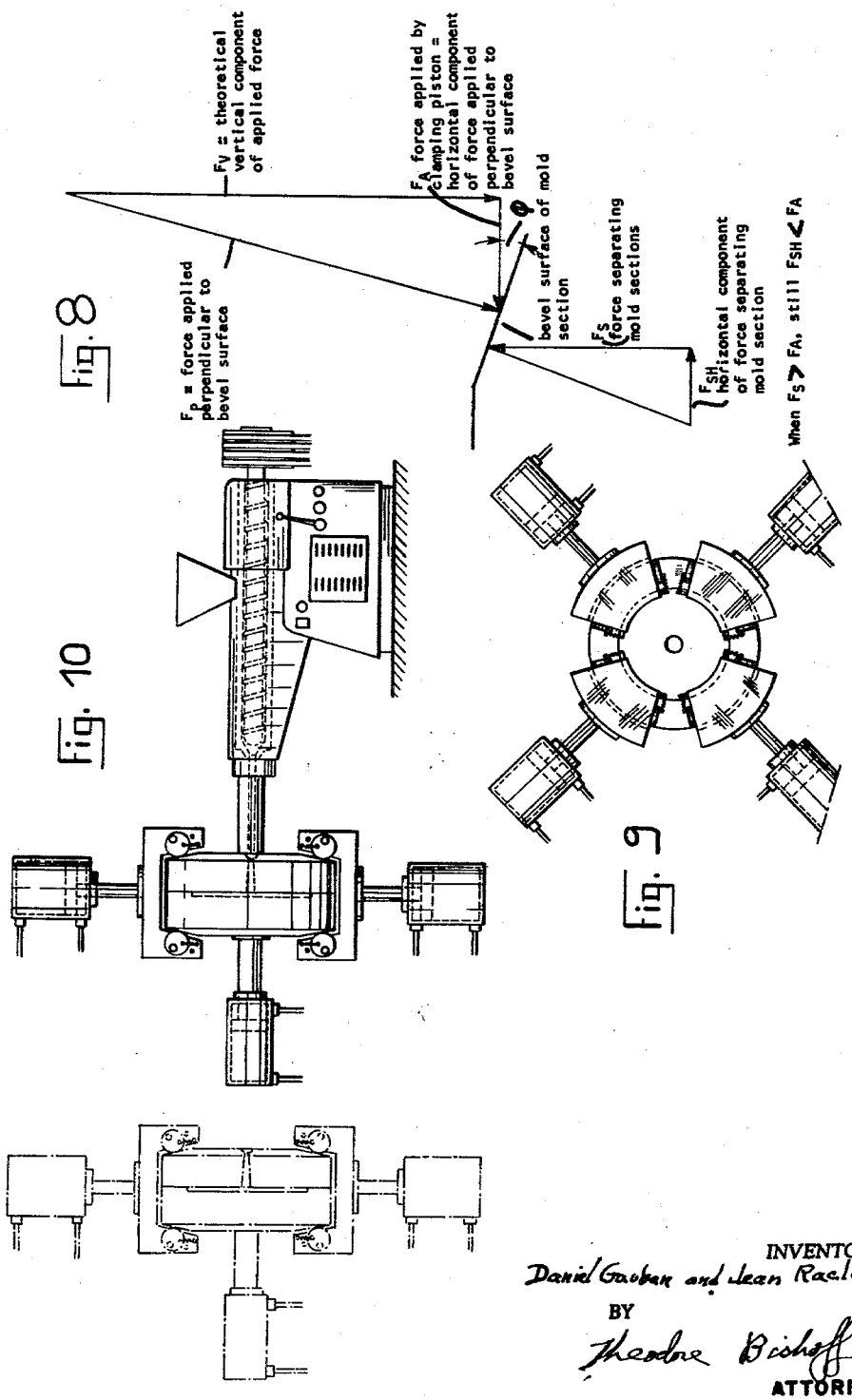

3,195,186
APPARATUS FOR CLAMPING MOLD PARTS
Daniel Gauban and Jean Raclot, Paris, France, assignors to Inventions Finance Corporation, a corporation of Delaware
Filed June 13, 1962, Ser. No. 202,334
12 Claims. (Cl. 18—43)

This invention relates to means of maintaining in engagement separable components of a given unit subjected to pressures separating the components. The invention is applicable to provide for locking of various forms of dies, casting units and mold sections, or the like, including but not limited to, dies used in fabricating elements from exotic and high temperature metals such as for example titanium, stainless steel, and the like, and molds used in various forms of plastic molding machines. For purposes of simplicity, however, the principles of the invention, and an exemplary structure, embodying the invention, are described below as applied to an injection-type molding machine.

To appreciate an exemplary clamping problem, consider the forces acting in an injection-molding machine. Some injection-molding machines on account of their small size have limited power capacity and are limited severely in size of mold cavity because the cavity frontal surface cannot exceed the actuating piston surface of the machine without resulting in separation of the mold sections. Heretofore, it has been most difficult, if not impossible, to have in a single action injection-molding machine, molded pieces in which the frontal surface is greater than the surface of the actuating and section maintaining piston. The problem is even more critical in a double action injection machine where the frontal surface of the molded piece is theoretically limited to a value lower than the surface of the actuating piston. Similar problems are encountered in die casting, and exotic metal forming due to the separation forces experienced.

The invention has as its primary object the elimination of the aforesaid problems by utilizing a simple method, and novel apparatus for carrying out the method, of locking together components subjected to separation forces, regardless of the cause of the separation forces. Moreover, a primary object hereof is to provide such an apparatus which effects the aforesaid locking action without interfering with the mold, die, or cavity-filling operation, regardless of the precise type step or series of steps which such operation may take. Still further, a primary object hereof is to provide such an apparatus which is applicable to various differing forms, shapes, and sizes of separable section units, including generally parallelogram units, generally circular units, flanged units, and/or multi-section units. In all these regards, a basic object hereof is to provide a method and apparatus conforming with the preceding objects, which method and apparatus, with a minimum of applied power, yield a strong and large locking force on the separable sections to maintain the same in engagement.

One of the specific objects of this invention is to provide means for use in a relatively inexpensive injection-molding machine which permit the production of large frontal surface molded pieces and at the same time, increase the production output without requiring complicated heating and cooling means, and without increasing the required operating power of the machine as was required heretofore in producing large frontal area molded articles.

According to the present invention, two separable mold sections, die plates, or cavity members, or two platens adapted to receive such sections, plates or members, are moved together in any suitable manner, and means are provided hereby which operate in accordance with the method hereof (1) to exert through hydraulic pressure, a clamping force on the separable sections, plates, or members or platens respectively whereby they are held in engagement position by a force exceeding that otherwise applied to bring the sections, plates, members, or platens together, and (2) to selectively release, through hydraulic pressure, the mold sections or platens whereby they can be separated for removal of a molded component. The clamping means provided hereby include jaws engaging opposed portions of the mold sections to prevent said sections from separating, for example, while the injection operation is in process. Such jaws allow the mold sections to remain under highest pressure during the entire time needed for the molding operation. When reversed, the jaws disengage and free the mold sections or platens. The platens and/or sections are so constructed as to insure a proper degree of clamping for variable predetermined pressures applied by the actuating jack or jacks.

Further in accordance to the present invention, auxiliary means are provided to facilitate the locking and unlocking of the clamping jaws, and to eliminating any possible danger of jamming and resultant deformation of the molds occurring due to wear of machine parts or due to an effect of dilatation caused by the heat or temperature of the mold sections or platens holding such sections. The auxiliary means operates in accordance with improved methods provided hereby which positively avoid any undesired separating movement of the mold sections of any kind, at any time—before, during, or after the cavity filling operation, regardless of the amount of the pressure employed.

A still further general object of the invention is to provide clamping means having pressure jaws capable of perfect regulation, adjustment, and control of the clamping operation regardless of the cavity filling pressure, or other pressures experienced in the cavity during fabrication of a component therein.

In addition to the above, a primary specific object of the invention is to provide clamping means conforming with the preceding objects, and incorporating two clamping jaws, one clamping jaw fixed to one platen, itself to be fixed; and a second movable clamping jaw adapted upon selective movement to cause locking and unlocking of the mold sections with a single jack in operation on each side of the mold, cavity sections, or die members. A single mold, die or cavity section or platen can be movable toward and away from closing or engagement position with the other mold, die or cavity section, or both sections can be movable.

An additional, and still other object of the present invention is to provide a clamping means as aforesaid which is adapted for use on a double action horizontally built injection machine, a vertical injection-molding machine, a die casting machine, or any other form of machine having a separable section forming cavity unit, and which eliminates and replaces any complicated hydraulic pressing system or systems now required on conventional machines. In this regard, a further object hereof is to provide such a clamping means which yields (a) greatest economy in the cost of the machine, (b) greatest economy of the product due to machine operation speed, (c) greatest quality article, and (d) trouble-free high performance of system operation of the machine.

The invention lies in the construction and arrangement of the clamping means provided hereby, and parts thereof, as applied to various different types and forms of machine ensembles. The invention will be better understood, and objects other than those specifically set forth above will become apparent when consideration is given to the following detailed description thereof. Such description makes reference to the preferred and illustrative embodiments of the invention presented in the annexed drawings, wherein:

FIGURE 1 illustrates a front elevational view of a hydraulically operated injection molding machine provided with one apparatus embodiment of the invention for exerting a clamping force on two molding platens to clamp them together;

FIGURE 2 is a diagrammatic or schematic illustration of the hydraulic operating circuit of the machine illustrated in FIGURE 1;

FIGURE 3 is a fragmental side view of the construction of the preferred apparatus embodiment hereof;

FIGURE 4 is a fragmental side view of a modification of the preferred apparatus embodiment hereof;

FIGURE 5 is a fragmental side view of another modification of the apparatus embodiment hereof;

FIGURE 6 is a fragmental side view of a still further modification of the apparatus embodiment hereof;

FIGURE 7 is a fragmental side view of a variation of the apparatus embodiment shown in FIGURE 6;

FIGURE 8 is a schematic force diagram showing the force relationships involved with the instant invention in carrying out the method hereof;

FIGURE 9 is a plan view of a cavity forming section of one type to which the apparatus and methods hereof are readily applicable; and FIGURE 10 is a side view of an injection molding machine which becomes feasible for use by virtue of the methods and apparatus hereof.

In the drawings, like reference numerals are used throughout to refer to like parts.

Referring to FIGURES 1 and 2 of the drawings, the injection molding machine is of the type known as Universal Vertical Thrusting Machine. There will be described in this specification only so much of the machine as is necessary for an understanding of the present invention. A lower molding platen 1 is carried by a piston and cylinder arrangement forming a jack 11 for the platen in such a manner that the platen 1 is movable up and down in a vertical direction. The platen 1 is shown in FIGURE 1 in solid lines in its lower "release" position, and in dotted lines in its upper "engagement" position.

An upper molding platen 2 is mounted in fixed position at the lower end of the injection pot 21. Platen 2 could be movable up and down toward platen 1 as shown in FIG. 2. Each platen carries a cooperating mold section 11(a) and 21(a) respectively which are relatively movable with movement of platen 1. When the molding platens 1 and 2 are in their engagement positions, two beveled clamping jaw members 3 and 4 each having an upper and lower jaw, are urged by piston-cylinder pressure exerting rams 31 and 41 from "release" positions shown in full lines in FIGURES 1 and 2 transversely of the platens 10 and 12 to "engagement" positions shown in dotted lines therein, so that they exert a clamping force on the platens 1 and 2 tending to hold them together, quite independently of the force exerted by the jack action now to be described.

Referring especially to FIGURE 2, platen 1 is moved toward platen 2 by pressure applied by pump 8 through line 81(a), valve 6 and line 81(b) to jack 11. When the piston of jack 11 moves the platen to "engagement" position, then the back pressure in line 81(b) operates valve 6 so that line 81(b) is closed and fluid is fed from pump 8 through valve 6 and lines 84(a) and 84(b) to jacks 31 and 41, thereby forcing the jaw members 3 and 4 toward one another so that their beveled surfaces engage correspondingly beveled surfaces on the platens 1 and 2. The pressure on the jaws is maintained during the injection operation, which takes place in a known manner.

When it is desired to separate platens 1 and 2 after the injection operation, the pressure in the cylinders of rams 31 and 41 is reversed by operating valve 6 to put the lines 81(b) and 84(a) and 84(b) in communication with the sump 100. Simultaneously, fluid is fed under pressure from pump 8 through line 85 to valve 7 and in turn through lines 87(a) and 87(b) to rams 31 and 41 to release the clamping jaw members 3 and 4. When the jaw members have withdrawn to release positions which are clear of the platens 1 and 2, valve 7 is operated to feed pressure fluid through line 84 from pump 8, so as to move jack 11 down and thus separate platens 1 and 2.

In the preferred jaw means shown in FIGURE 3, the clamping jaw member 4 has rollers 42 eccentrically mounted on the upper and lower arms thereof. When the jaw members 4 is in its release position, the rollers 42 are urged against stops 43 by springs 44. When in engagement with the platens 1 and 2, as shown, the rollers 42 exert a clamping force on the platens, but permit easy release of the jaw members 4 after the injection operation, notwithstanding any heat or pressure expansion of the platens 1 and 2. Two such jaw members would be used in the machine shown in FIGURE 1.

Referring to FIGURE 4, the clamping jaw 4 is formed with a lower jaw arm 45 permanently bolted to the lower platen 1 and an upper beveled abutment 46' which is transversely slidable. The abutment 46', has a roller 42' eccentrically mounted thereon. When the abutment 46' is in its release position, the roller 42' is urged against a stop 43' by a spring 44'. When the abutment 46' is in its illustrated engagement position, the roller 42' exerts a clamping force on the platen 2, but permits easy release of the abutment 46' after the injection operation, notwithstanding any heat or pressure expansion of the platens 1 and 2.

The reason underlying the selection of the FIGURE 3 construction as the preferred embodiment, and/or the modification thereof in FIGURE 4, becomes readily apparent upon consideration of frictional forces encountered with the clamping jaw construction of FIGURE 1. The jaw members have an engaging flat surface which must slide over the mating beveled surface of the platens. Thus, the applied force must overcome the friction of engagement in operation of the clamping jaws in accordance with the methods hereof. When a clamping jaw having a roller thereon, as shown in FIGURES 3 and 4 is utilized, the frictional opposing force is virtually eliminated because the rolling action presents substantially no friction—the surface area of frictional contact being minimized. Moreover, the roller is rotatable about an offset axis 42(a), and thus acts not only as the instrumentality through which a clamping force is applied to the separable parts, but also as a locking cam member, thus increasing the locking force with rotation of the roller. In essence, the preferred embodiment uses the friction to increase the locking force, i.e., the friction causes rotation of the roller and therey application of a cam locking force which supplements and effectively by force multiplication increases the locking force applied through the jaws by the associated hydraulic ram 31 or 41, as shown.

With all of the arrangements suggested above, in accordance with the method aspects of the invention, the mold sections are clamped together by forces directly exerted laterally of the molding axis—i.e., laterally of the axis of movement of the mold sections toward and away from one another. These clamping forces, by virtue of the beveled structure between the clamping jaw and the mold sections or platens, have a vertical applied force component which is substantially larger than the horizontal component. The forces tending to separate the mold sections are vertical, and cannot oppose the lateral forces except through the bevel angle. Since the bevel angle φ, (FIGURE 8) is acute, the lateral component of the vertical mold forces is small, and the vertical pressure tending to separate the mold sections can far exceed the lateral clamping forces exerted by the clamping piston and cylinder devices. The relationship of the forces should be apparent from FIGURE 8. It will be noted from this figure that the clamping piston force $F_A$ need only exceed the horizontal component of the mold separating force $F_{SH}$ for clamping to positively exist. Thus, due to the bevel angle, the separating force FS can far exceed the applied force, FA.

Referring to FIGURE 5, the clamping jaw member is provided with a lower jaw arm 45 permanently bolted to the lower platen 1 and an upper beveled lock abutment 46 which is transversely slidable by means of a piston-and-cylinder jacking arrangement 41 between an inner engagement position (illustrated) and an outer release position. The upper platen 2 has a correspondingly beveled surface where it is engaged by the abutment 46. Again, two such jaw members may be used in the machine shown in FIGURE 1.

In FIGURE 6, a jaw member 4 is formed by two jaw arms 47 and 48 pivoted at the ends of a cross member 49 which is fixed with the frame of the machine (not shown in FIGURE 6). The arms 47 and 48 are connected between member 49 and the platens 1 and 2, to a double-end piston-and-cylinder ram 41'. The arms 47 and 48 exert a clamping force on the platens 1 and 2 when hydraulic fluid is introduced into each end of the ram of the device 41'. The ratio between the clamping force on the platens 1 and 2 and the force of the ram 41' is dependent upon the position of connections 39(a) and 39(b) between cross-member 49 and the platens 1 and 2. The arms 47 and 48 are released by the introduction of fluid under pressure into the central portion of the cylinder of the ram 41'. A double acting ram such as 41' is conventional, and further explanation of the details thereof appears unnecessary.

A similar device to that shown in FIGURE 6 is shown in FIGURE 7, with the modification that the cross member 49 is mounted between the double-ended piston-and-cylinder ram 41" having closed ends, and the platens. In this arrangement the jaws are clamped by the introduction of hydraulic fluid into the central portions of the cylinder of the ram 41" and are released by introducing fluid into each end of the cylinder of the device 41".

Consistent with the above described embodiments with the various modifications and construction, the following results can be appreciated:

(1) That the various embodiments of the invention can be applied to various types of apparatus, other than injection molding machines, where cavity section separation problems are encountered. These other types of apparatus include, as also suggested above, equipment for fabricating exotic and/or high temperature metals, for example wherein the cavity can be circular as shown in FIGURE 9. It is important to understand therefore, that the injection molding machines illustrated in the drawings are presented to facilitate comprehension of the invention, and while an important aspect of the invention lies in applying the same to, and with, such machines, the invention has other equally, if not more important, uses.

(2) The embodiments as described possess the advantages in an injection molding machine, as shown, that the pressure jack 11 to move platen 1 does not need a large clamping force during the injection operation. This enables molded articles of a large surface area to be produced on comparatively simple and with inexpensive, machines, such as the Universal vertical trusting units. Whereas, a single-action—i.e., a single-main jack vertical machine, has been described, the invention is applicable to machines which incorporate means for moving both of the platens toward and away from one another, as well as other forms of apparatus, all explained above.

(3) As an alternative to the hydraulic circuit shown in FIGURE 2, a different circuit may be provided which permits the pressure to be released completely from jack 11 during the injection operation. In any event, the force of jack 11 need only be sufficient to move platen I toward platen 2, and in fact platen 1 can be supported on a movable base, as shown in FIGURE 10, so as to be readily separated entirely from the other portions of the machine.

(4) The injection molding machine built in accordance with the invention does not correspond to the existing conventional standard presses, as it is no longer the initial "pressure" on the molds which determines the capacity of the apparatus and its products, but instead, the combination of the locking and the strength or power of the clamping jaws.

(5) The clamping force being determined by the strength of the jaw members, it is obvious that when the mold and platens 1 and 2 are locked, the opening of the molds is prevented by the jaws alone. For that reason a power inferior to the force of said jaws is sufficient to place them against platens 1 and 2.

(6) By concentrating the pressure on the clamping jaws without increasing the power of the press section, and by eliminating the closing pressure on the mold during the injection operation, a definite saving of energy and a reduction of the wear due to hydraulic flow will result, particularly since, as stated, the engagement of the mold sections is maintained by independent and separate means, namely, a clamping system as provided hereby. By the saving in energy consumption and the relieving as much as possible of all hydraulic flow, it is possible to obtain molding apparatus that is lighter and more economical than other apparatus of classical construction, while giving all-around better molding results.

(7) The clamping force need be limited only by the strength of the jaw members 3 and 4 and the effort from the rams 31 and 41, 41' and 41" in the illustrated arrangements. Upon understanding the techniques provided hereby, it should be apparent that the invention, and particularly the embodiment of FIGURES 3 and 4, effectively provides for multiplication of force through the clamping arrangement.

(8) While the valves 6 and 7 have been considered as selectively operable valve means to control fluid pressure, it can be desirable in practice to use a distributor for the initial energy of the press. With the use of a distributor, pressure can be simultaneously applied to jack 11 and the clamping jaws 31 and 41. In this instance, the system hydraulic pressure should be judiciously utilized by distributing and dividing the said energy between the main jack 11 and the rams 31 and 41, and the entire energy can be less than the strength of the clamping jaws.

(9) To ensure the most satisfactory distribution of the available energy, the "distributor" device can be assembled from known components, to permit a choice between different combinations. As stated, one can distribute the entire energy between the locking jaws 31 and 41, or can have a distribution between these jaws and jack 11 with appropriate proportions, bearing in mind that any energy used by jack 11 must be subtracted from the energy necessary for the locking jaws, and that to enable these jaws to perform their function, the power of each one should be at least equal to the pressure of the entire machine. Therefore, the use of such a distributor device enables a more adaptable operation of the whole apparatus, permitting different combinations as become necessary.

(10) Finally, and as described hereinabove, the clamping jaws can be actuated in a double acting conventional press machine, resulting in the elimination of the entire pressure group or section of said press—a result of obvious importance in any machine—for any use whatever, where closing parts subjected to an internal force are thereby urged in the opening direction.

The present invention as detailed in the foregoing description is to be considered in all respects as illustrative and not restrictive. Various modifications may occur, and the clamping devices, or pressure jaws, could be operated mechanically, electrically, pneumatically, or electro-mechanically instead of hydraulically or hydro-mechanically. They could also be actuated automatically, semi-automatically or manually. Regardless of these modifications, from the foregoing description, it should be apparent that the objects set forth above have been successfully achieved. Accordingly,

What is claimed is:

1. Apparatus for clamping separable engaging components subjected to internal separation forces in engagement comprising clamping means reciprocally movable at least generally parallel to the plane of separation of said components, cooperating surfaces on said clamping means and at least one of said components for transferring force through said surfaces at an acute angle to said plane of separation, one of said surfaces comprising a roller forming part of said clamping means and being eccentrically mounted therein with respect to the geometric center of said roller, and means for moving said clamping means and maintaining said surfaces in engagement under pressure.

2. In combination with an injection molding machine having separable mold sections at least one of which is movable toward the other to engage along a plane, said mold sections including support surfaces at least one of which is inclined with respect to said plane, and means to move at least one of said sections into engagement with the other, clamping means for securing said sections together, said clamping means including a pair of jaws, said jaws including a reciprocal beveled arm movable parallel to said plane and cooperating with said inclined support surface, and an eccentric roller mounted on said arm, said roller being positioned to exert a clamping force on said inclined support surface, said clamping means being indepentent of said means for moving.

3. In an apparatus for clamping two relatively reciprocal elements at least one of which has a support surface inclined relative to the path of movement of said relatively reciprocal elements, the combination comprising clamping means having first arm means engaging one of said elements and a reciprocal arm means operable to engage the support surface of said other element, said reciprocal arm means having an eccentrically mounted roller, said reciprocal arm means being operable to be advanced into clamping position such that the roller initially engages said support surface along a line of contact whereby by friction therebetween causes the roller to rotate such that the line of contact becomes progressively more remote from the axis of rotation to thereby increase the clamping force between said roller and said first arm means.

4. In an apparatus for clamping two relatively reciprocable elements at least one of which has a support surface inclined relative to the path of relative movement of said reciprocal elements, the combination comprising clamping means having first arm means engaging one of said elements and a reciprocal arm means operable to engage the support surface of said other element, said reciprocal arm means comprising an eccentrically mounted roller, said arm means being movable in one direction to a position causing said roller to contact said support surface whereby further movement in said one direction tends to rotate said roller due to the frictional contact in a direction tending to cause the furtherest extremity of the roller from the rotational axis thereof to approach said line of contact thereby increasing the clamping force between said first arm means and said roller.

5. In an apparatus for clamping two relatively reciprocal elements at least one of which has a support surface inclined relative to the path of movement of said relatively reciprocal elements, comprising reciprocal arm means to engage the support surface of said one element, said arm means eccentrically mounting thereon a roller arranged such that said support surface offers an uphill surface to said roller, said reciprocal arm means being operable to be advanced to a position wherein the contact force between said support surface and said roller rotates the latter in a direction tending to wedge the roller between said support surface and the axis of rotation of the roller thereby increasing the clamping force on said relatively reciprocal elements.

6. In combination, an injection molding machine having separable mold sections movable into engagement with one another, said mold sections having support surfaces inclined relative to the path of travel of said mold sections, clamping means securing said mold sections together, said clamping means comprising a pair of reciprocal arms, rollers eccentrically mounted on each of said arms so as to have the extremity thereof furtherest from the axis of rotation in advance of said axis considered generally along the path of travel of said reciprocal arms when the latter are being reciprocated to clamp the mold sections, whereby each roller will initially contact said support surface along a line of contact in advance of said axis but rearwardly of said furtherest extremity such that the frictional engagement of said contact tends to rotate the roller in a direction to increase the clamping force.

7. In an apparatus for clamping two relatively reciprocal elements at least one of which has a support surface inclined relative to the path of movement of said reciprocal elements, comprising a reciprocal arm means operable to be advanced to a position to engage the support surface of said one element, said arm means having a roller eccentrically mounted thereon with the furtherest extremity thereof from the axis of rotation being in advance of said axis along the path of travel of said arm means considered when the latter is being advanced into clamping position such that the roller will initially contact said support surface along a line of contact in advance of said axis but rearwardly of said furtherest extremity whereby the frictional engagement of said contact upon further advancement of said arm means toward its clamping position causes rotation of the roller such as to urge said furtherest extremity to approach the line of contact thereby wedging the roller against said support surface and increasing the clamping force applied thereto.

8. In an apparatus for clamping two relatively reciprocal elements at least one of which has a support surface inclined relative to the path of movement of said reciprocal elements, the combination comprising clamping means having first arm means engaging one of said elements and a reciprocal arm means operable to engage the support surface of said other element, said reciprocal arm means having an eccentrically mounted roller, said reciprocal arm means being operable to be advanced toward a clamping position such that the roller contacts said support surface, said support surface providing an uphill surface to said roller such that advancement of the reciprocal arm causes greater contact force between the support surface and the roller with the friction resulting therefrom urging rotation of said roller in a direction tending to cause the furtherest extremity of the roller from the rotational axis thereof to approach the line of contact thereby increasing the clamping force between said roller and said first arm means.

9. In an apparatus for clamping two relatively reciprocal mold sections, the combination comprising clamping means having first arm means engaging one of said mold sections and a reciprocal arm means operable to engage the other mold section, said reciprocal arm means being operable to be advanced to a clamping position in a direction perpendicular to the axis of relative movement of said mold sections wherein said reciprocal arm means lies within the projected path of movement of said mold sections, at least one of said mold sections having an inclined surface defined by an increasing distance from the general mating line of the two mold sections considered as the reciprocal arm means is advanced to said clamping position, a roller eccentrically mounted on said arm means such that when the latter is advanced the roller contacts said inclined surface along a line of contact causing the roller to rotate such that the line of contact becomes progressively more remote from the axis of rotation thereby increasing the clamping force between said first arm means and said roller.

10. In an apparatus for clamping two relatively reciprocal elements at least one of which has a support surface inclined relative to the path of movement of said relatively reciprocal elements, the combination comprising clamping means having first arm means engaging one of said elements and a reciprocal arm means operable to engage the support surface of said other element, said reciprocal arm means having an eccentrically mounted roller, a stop on said arm, a spring urging rotation of said roller in one direction against said stop, said reciprocal arm means being operable to be advanced to a clamping position wherein the roller initially contacts said support surface to cause rotation thereof in a direction opposite from said one direction in opposition to the bias of said spring, said latter rotation urging the furtherest extremity of said roller from the axis of rotation thereof to approach the line of contact between the roller and the inclined surface thereby wedging the roller against the latter and increasing the clamping force applied thereto, retraction of said arm allowing said spring means to rotate said roller in said one direction out of contact with the support surface thereby facilitating withdrawal of said reciprocal arm from its clamping position.

11. An apparatus for clamping two relatively reciprocal mold assemblies, comprising a member having a first jaw arm extending in a direction substantially perpendicular to the axis of relative movement of said mold assemblies, and a reciprocal jaw arm supported by said member and movable with respect thereto in a plane substantially parallel to said first jaw arm, said reciprocal jaw arm having a beveled surface to engage a complementary surface on one of said mold assemblies when advanced to a clamping position wherein said reciprocal jaw arm lies within the projected path of movement of the mold assemblies and wedges the mold assemblies together and toward said first jaw arm.

12. A clamping apparatus as set forth in claim 11 in combination with two relatively reciprocal mold assemblies one of which is provided with an inclined support surface, said reciprocal jaw arm being operated to advance to said clamping position and engage said inclined surface by a fluid pressure ram secured to said member, said first jaw arm being directly engaged with and fixedly secured to said other mold assembly.

References Cited by the Examiner
UNITED STATES PATENTS

| | | |
|---|---|---|
| 2,115,590 | 4/38 | Ryden. |
| 2,319,479 | 5/43 | Ryden. |
| 2,332,678 | 10/43 | Tucker _____ 264—328 |
| 2,332,679 | 10/43 | Tucker _____ 264—328 |
| 2,492,259 | 12/49 | Beuscher _____ 18—30 |
| 2,498,264 | 2/50 | Goldhard _____ 18—30 |
| 2,541,544 | 2/51 | Rahaim. |
| 2,972,964 | 1/58 | Allemann _____ 294—88 |
| 3,067,598 | 12/62 | Schirm. |

J. SPENCER OVERHOLSER, *Primary Examiner.*

MORRIS LIEBMAN, ALEXANDER H. BRODMERKEL, MICHAEL V. BRINDISI, *Examiners.*